United States Patent Office 3,084,197
Patented Apr. 2, 1963

3,084,197
REFINING OF THIOCRESOLS
Robert J. Laufer, Pittsburgh, Pa., assignor to Consolidation Coal Company, Pittsburgh, Pa., a corporation of Pennsylvania
No Drawing. Filed Nov. 21, 1960, Ser. No. 70,406
15 Claims. (Cl. 260—609)

This invention relates to the refining of mixtures. Specifically, it relates to the separation and recovery of individual thiocresol isomers from a mixture containing parathiocresol in admixture with at least another thiocresol isomer. More particularly, it relates to the recovery of individual thiocresol isomers in high purity and in high yield by a novel alkylation-dealkylation process. The initial mixture may contain parathiocresol and the other thiocresol isomers as such, or as their t-alkyl sulfides.

Commercial quantities of mixed thiocresols (toluenethiols), containing ortho-, meta-, and parathiocresols, are available as by-products of the refining of cresylic acid-thiophenol mixtures derived from the caustic washing of gasoline. No methods for the separation of individual thiocresol isomers from mixed thiocresols are known. Heretofore, to obtain individual thiocresol isomers, synthesis at a relatively high cost has been required.

In marked contrast with their cresol or xylene analogs, the three thiocresol isomers boil at essentially the same temperature, precluding their separation by high efficiency fractional distillation. Fractional crystallization techniques are not of interest unless the highest melting isomer, parathiocresol (M.P. 43–44° C.), is present in major concentration. Also, for recovery of all components present, an impractically large number of freezing and thawing stages would be required. This invention provides means for refining a commercial mixture of thiocresols, and particularly for recovering parathiocresol therefrom.

Accordingly, it is an object of the present invention to refine mixtures of thiocresols or their t-alkyl sulfides containing at least parathiocresol or its t-alkyl sulfide in admixture.

It is a further object to provide a method for recovering parathiocresol from admixture with at least another thiocresol.

It is still another object to provide a method for separating meta- and parathiocresols from each other.

It is yet another object to provide a method for recovering individual meta- and parathiocresol isomers from a mixture of their t-alkyl sulfides.

In its broadest aspect, the process of this invention is applicable to separating the individual components of an initial mixture containing parathiocresol and at least another thiocresol isomer or the t-alkyl sulfides of these isomers. In a first aspect, the initial mixture contains these thiocresol isomers as such. In a second aspect, the components of a mixture containing the t-alkyl sulfides of these thiocresol isomers are separated.

In accordance with the first and principal aspect of this invention, a mixture of parathiocresol and at least another thiocresol isomer is reacted with a t-alkyl-generating olefin having from 4 to 12 carbon atoms in the presence of an alkylation catalyst. Parathiocresol forms its t-alkyl sulfide. It is separated from the other reaction products by fractional distillation. Parathiocresol is then regenerated by sulfide cleavage of the separated t-alkyl p-tolyl sulfide.

In copending application Serial No. 70,657, filed of even date herewith, is described a process for separating orthothiocresol from admixture with meta- or parathiocresol. The process described in Serial No. 70,657 utilizes the discovery that when a mixture containing orthothiocresol and at least one of meta- and parathiocresols is reacted with a t-alkyl-generating olefin in the presence of a selective ring-alkylating catalyst, orthothiocresol is alkylated in the para position of the ring (C-alkylation), whereas meta- and parathiocresols form only their t-alkyl sulfides (S-alkylation). The reaction products are then separated by fractional distillation. The process described in Serial No. 70,657 may be used in conjunction with the present process, and reference should be made to Serial No. 70,657 for fuller details of that process.

The present invention is principally directed to separating a mixture of meta- and parathiocresols, usually in the form of their t-alkyl sulfides, as obtainable from the process described in Serial No. 70,657. As is known, o-cresol is readily separable from m-p-cresols, which latter are not directly separable by conventional distillation techniques. Somewhat surprisingly, it has been discovered that the t-alkyl sulfide of p-thiocresol may be separated by fine fractionation from the t-alkyl sulfides of o- and m-thiocresols. The latter pair are not separable from each other.

In practicing the present invention, if all three thiocresol isomers are present, then a selective ring-alkylating catalyst will preferably be used. If only meta- and parathiocresols are present, then a conventional non-selective alkylation catalyst will preferably be used. With either catalyst, only the t-alkyl sulfides of meta- and parathiocresols will be formed. Of the three thiocresol isomers, only orthothiocresol is capable of undergoing ring alkylation.

Where only orthothiocresol and parathiocresol are present, separation may be accomplished either by an initial selective ring alkylation, as described in Serial No. 70,657, or by initial non-selective alkylation, forming both sulfides, and proceeding in accordance with the present invention. Also, where recovery of p-thiocresol from a mixture of all three thiocresol isomers is a desideratum, then conventional non-selective alkylation may be used, forming all three sulfides, followed by recovery of the t-alkyl p-tolyl sulfide and cleavage of this sulfide to regenerate p-thiocresol.

The term "t-alkyl-generating olefin" refers to an olefin capable of generating or yielding a tertiary alkyl group as a substituent in an alkylation reaction. Exemplary monoolefins are isobutylene yielding a t-butyl group, methylbutene yielding a t-amyl group, and the like. "Ring dealkylation," as used herein, refers to removal of a t-alkyl group from the para position of the ring of a 4-t-alkyl-o-thiocresol. The methyl group at the ortho position of the ring is not affected. By the term "sulfide cleavage" as used herein, reference is made to the removal of a t-alkyl group attached to the sulfur atom of an S-substituted thiophenol whereby the thiophenol is formed.

Isobutylene is used as a preferred alkylating agent. Where all three thiocresol isomers are initially present, a ring-alkylating catalyst will preferably be used. The resulting reaction mixture then consists principally of 4-t-butyl-o-thiocresol, t-butyl m-tolyl sulfide, and t-butyl p-tolyl sulfide. The ring-butylated o-thiocresol is separated from the two butylated sulfides by fractional distillation. The 4-t-butyl-o-thiocresol is then debutylated under ring-dealkylation conditions to convert it to o-thiocresol. The t-butyl m-tolyl sulfide and t-butyl p-tolyl sulfide are separated from each other by fine fractional distillation. The individual sulfides are then converted respectively to m-thiocresol and p-thiocresol by sulfide-cleavage debutylation techniques. Thereby, a mixture of thiocresol isomers may be separated into their individual isomeric components and recovered in high yield and in high purity.

Using isobutylene as preferred alkylating agent, the process of this invention is applicable to the separation and recovery in high purity of metathiocresol or parathiocresol or the t-butyl sulfide thereof. For example, a mixture consisting of meta- and parathiocresols may be synthesized from commercially available mixtures of metacresol and paracresol. These two cresols can be separated only with considerable difficulty using highly specialized laboratory techniques. The m-p-cresols upon reaction with ammonia form a mixture of meta- and para-toluidines. Then by a Leuckart-type synthesis, these substituted anilines may be converted to a mixture of meta- and parathiocresols. It has also been reported that a mixture of meta- and parathiocresols may be formed by a catalytic high-temperature vapor-phase reaction between hydrogen sulfide and m-p-cresols. The process described herein may be readily applied to the separation of such mixtures.

The first aspect of the process of this invention is particularly applicable in conjunction with the process shown in Serial No. 70,657 used for the separation of mixed thiocresols obtained from the fractionation of crude aromatic mercaptans as a by-product of the refining of crude cresylic acids. Approximately half of the distillate obtained from the fractionation of the aromatic mercaptans, consists of thiocresols, which, after treatment for the removal of tar acid contaminants, typically contain an isomer distribution of 35–40 percent ortho, 43–48 percent meta, and 15–17 percent para by weight. These mixed thiocresols have a boiling point at 760 mm. Hg of approximately 194° C. A preferred aspect of the process of this invention will therefore be described with respect to the separation of such mixtures.

The mixed thiocresols are preferably butylated, and preferably in the presence of boron trifluoride-phosphoric acid complex as catalyst to form a reaction mixture of butylated thiocresols. Only the o-thiocresol isomer will be alkylated in the para position of the ring, the meta- and parathiocresols forming their t-butyl sulfides.

In practicing the present invention, optimum results are obtained using isobutylene as an alkylating agent. Thus while other t-alkyl-generating alkylating agents may be used, there is little economic incentive to employ any other than isobutylene because of the relative inefficiency of these other alkylating agents. Also, higher molecular weight alkylating agents result in products having higher boiling points; these higher boiling isomeric products generally have smaller differences in boiling point among them, thereby making separation by fine fractional distillation more difficult.

In order to obtain the individual thiocresol isomers in high purity and in high yields, butylation conditions affording maximum selectivity and conversion are desired. These conditions are described in Serial No. 70,657. However, optimum conditions for butylation of the o-thiocresol will not ordinarily result in complete conversion of the meta- and parathiocresols to their t-butyl sulfides. Any unreacted meta- and parathiocresols, which may be readily recovered by distillation from the reaction mixture as a low-boiling fraction, may be converted to their t-butyl sulfides by further reaction with isobutylene in the presence of any suitable alkylation catalyst. Since only sulfide formation can occur, a conventional non-selective catalyst, i.e., one not capable of functioning with respect to ring alkylation, may be used. Sulfuric acid is exemplary of a catalyst promoting only sulfide formation.

The sulfide of the ring-butylated 4-t-butyl-o-thiocresol, namely, t-butyl 4-t-butyl-o-tolyl sulfide (B.P. 156°/20 mm.), is formed in minor amounts during the butylation reaction; it may be readily separated from the reaction mixture because of its higher boiling point. This compound may then be cleaved by sulfide-cleavage techniques to provide additional amounts of 4-t-butyl-o-thiocresol. The 4-t-butyl-o-thiocresol (B.P. 136.5°/50 mm.) and t-butyl p-tolyl sulfide (B.P. 139.5°/50 mm.) may be separated from the butylated reaction mixture by fractional distillation into a sulfide mixture, and then separated from each other by fine fractional distillation. Each of these compounds is then separately cleaved by sulfide-cleavage techniques to provide m-thiocresol and p-thiocresol, respectively.

Particularly preferred alkylation conditions for the isomer separation include a molar ratio of isobutylene to thiocresol of 0.75–1.0:1, a reaction temperature between 75 and 100° C., and a catalyst concentration of the boron trifluoride-phosphoric acid complex of approximately between 8 and 12 weight percent based on the total thiocresols charged. A reaction time of between 2 and 6 hours is usually sufficient for optimum butylation results.

The following equations represent the predominant reactions which occur under preferred conditions for practicing the invention:

(1) Selective butylation—
(a) Ortho

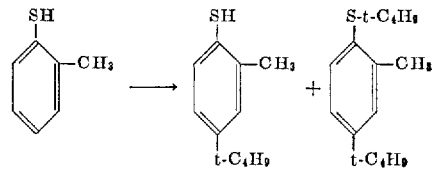

(b) Meta

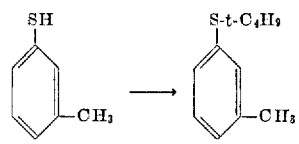

(c) Para

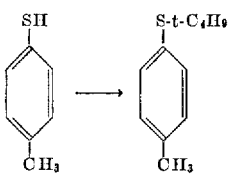

(2) Ring dealkylation—
Ortho

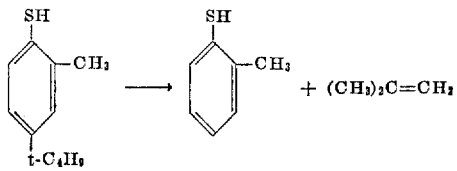

(3) Sulfide cleavage—
(a) Ortho

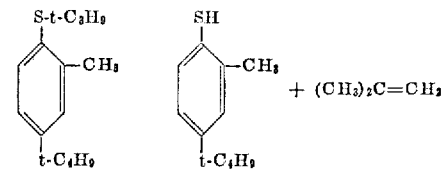

(b) Meta

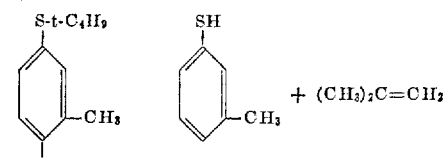

(c) Para

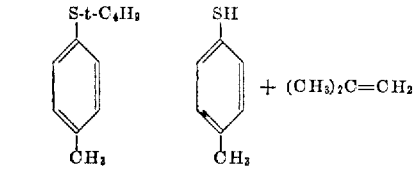

I. ALKYLATION

All three thiocresol isomers are capable of S-alkylation, i.e., sulfide formation. This will occur when t-alkyl-generating olefins are used as alkylating agents in the presence of non-selective catalysts such as zinc chloride, antimony trichloride, titanium tetrachloride, sulfuric acid, phosphoric acid, and ferric chloride. However, since the sulfides of o-thiocresol and m-thiocresol boil together and cannot be separated by fine fractional distillation, this method does not provide a means for separating o-thiocresol and m-thiocresol. It does provide a means for separating the sulfide of p-thiocresol from the sulfide mixture of o- and m-thiocresols and hence for recovery of p-thiocresol per se.

It has been discovered that certain catalysts are capable of ring-alkylating o-thiocresol in its para position under selected ring-alkylation conditions. Under these same conditions, the meta- and parathiocresols are converted only to their sulfides, no ring alkylation occurring. t-Alkyl-generating olefins may be used for effecting both the ring alkylation of the orthothiocresol and the S-alkylation of the meta- and parathiocresols.

A preferred selective alkylation catalyst that may be used in the practice of this one phase of the invention, using a t-alkyl-generating unsaturated aliphatic hydrocarbon having from 4 to 12 carbon atoms as alkylating agent, is boron trifluoride-phosphoric acid complex. This catalyst minimizes formation of the sulfides of o-thiocresol while at the same time provides a high yield of ring-butylated o-thiocresol. Isobutylene is also preferred as alkylating agent because yields with this compound are usually greater than those obtained with higher molecular weight alkylating agents, and the reaction products obtained are more readily handled, being lower boiling and having a greater differential in boiling range among them. The use of boron trifluoride-phosphoric acid complex as catalyst is preferred inasmuch as this catalyst is highly selective and yet does not degrade the thiocresols, despite the marked sensitivity of thiophenols to degradation in the presence of strong acid-type catalysts. Furthermore, this catalyst is insoluble in the alkylated thiocresol reaction products, and therefore may be readily recovered from the system by simple decantation and effectively reused.

Obviously, the various reaction parameters such as temperature, time, and reactant proportions are interrelated. Depending upon specific reaction conditions, a reaction time of as little as half an hour may be employed. In general, reaction times between 2 and 6 hours are preferred. Under optimum conditions of temperature and of catalyst concentration, as well as optimum isobutylene to o-thiocresol ratio, an increase in the reaction time beyond 3 hours (after addition of the isobutylene and after attainment of selected reaction temperature) gives little increase in yield of 4-t-butyl-o-thiocresol at the expense of the by-product sulfides.

II. DISTILLATION

Under preferred reaction conditions, using isobutylene as alkylating agent, the reaction mixture of butylated thiocresols ordinarily contains, in order of increasing boiling point, unreacted meta- and parathiocresols, t-butyl m-tolyl sulfide, t-butyl p-tolyl sulfide, 4-t-butyl-o-thiocresol, and t-butyl 4-t-butyl-o-tolyl sulfide. Under preferred reaction conditions, essentially all of the o-thiocresol is converted, with none of the converted product consisting of t-butyl o-tolyl sulfide. On fractional distillation of the reaction mixture, the unreacted thiocresols, which boil at 105° C. at 50 mm. Hg pressure, are recovered first from the reaction mixture. The t-butyl m-tolyl and p-tolyl sulfides are next recovered, boiling at 137° C. at 50 mm. Hg pressure. The 4-t-butyl-o-thiocresol boiling at 155° C. at 50 mm. Hg pressure is next recovered, followed by the highest boiling t-butyl 4-t-butyl-o-tolyl sulfide (B.P. 156° C. at 20 mm. Hg pressure). The isomers in the fraction consisting of the t-butyl m-tolyl and p-tolyl sulfides show a 3° C. boiling point difference under 50 mm. Hg. pressure. These two compounds may be separated into their individual isomers by fine fractional distillation using at least 20 and preferably about 50 to 75 theoretical plates to achieve a fractionation into t-butyl m-tolyl sulfide, B.P. 136.5° C. (50 mm. Hg) and t-butyl p-tolyl sulfide, B.P. 139.5° C. (50 mm. Hg).

III. RING DEALKYLATION

The ring dealkylation of the 4-t-alkylthiophenols i.e., removal of the t-alkyl group from the para position of the ring, is accomplished in the presence of a ring-dealkylation acid catalyst at elevated temperatures between 200 and 300° C. A preferred class of solid acid catalysts which are highly selective for the ring dealkylation of t-alkylthiophenols and do not degrade the thiophenol includes solid phosphoric acid, anhydrous zinc chloride, and natural and synthetic acid clays. Exemplary of effective natural clays are the activated acid-washed bentonites or related montmorillonite-containing clays. These should be relatively free of impurities. Among synthetic clays are included silica-alumina, silica-magnesia, and alumina-boria. These acidic activated natural clays and synthetic clays, as well as solid phosphoric acid and zinc chloride, are known to the art as catalytic agents in the cracking of gas oil and are commercially available.

Specific ring-dealkylation processes are disclosed and claimed in the copending applications of M. D. Kulik and M. B. Neuworth, S.N. 94,160, and of R. J. Laufer, S.N. 94,162, both filed March 8, 1961, and assigned to the assignee of the present application.

Solid phosphoric acid catalyst, as this term is used in the art, refers to a solid porous granular material, e.g., kieselguhr, silica-gel, etc., which has been impregnated with an acid of phosphorus, e.g., phosphoric acid, and then calcined to produce a desired lower state of hydration of the catalyst. The nature and preparation of solid phosphoric acid catalysts are well known in the polymerization art, and numerous prior disclosures set forth the features of these catalysts. One such commercially available solid phosphoric acid catalyst is known as UOP #2.

It has been found that solid phosphoric acid catalyst is particularly effective in debutylating 4-t-butyl-o-thiocresol with minimal degradation of the ring-butylated thiophenol and with almost complete conversion of the 4-t-butyl-o-thiocresol to o-thiocresol and isobutylene. This debutylation proceeds satisfactorily at a temperature between 200 and 300° C., and preferably at a temperature between 225 and 250° C. at atmospheric pressure. Atmospheric conditions are convenient and preferred, particularly since with this catalyst essentially no degradation of the thiophenol occurs at the elevated temperatures used. A catalyst concentration of from 2 to 20 percent by weight of the 4-t-butyl-o-thiocresol is suitable, with a concentration between 5 and 15 percent by weight being preferred.

In general, since ring dealkylation of a t-alkyl group requires a much higher temperature than cleavage of the t-alkyl group from the sulfur atom (sulfide cleavage), all non-degrading catalysts effective for ring dealkylation are equally suitable for sulfide cleavage; the converse does not necessarily apply. In certain instances, e.g., debutylation of t-butyl 4-t-butyl-o-tolyl sulfide, it is feasible to accomplish both sulfide cleavage and ring dealkylation in the same operation, the sulfide cleavage occurring first followed by ring dealkylation. However, because this may lead to the formation of undesired side products, it is preferable to first cleave the t-butyl group from the sulfur atom of the foregoing compound, forming 4-t-butyl-o-thiocresol, isolating this latter compound, and then ring dealkylate the remaining t-butyl group.

IV. SULFIDE CLEAVAGE

The catalysts listed as suitable for ring dealkylation are equally effective for sulfide cleavage since this latter cleavage is degradatively less severe and occurs at a lower temperature. Therefore, effective ring-dealkylation catalysts which do not desulfurize or otherwise degrade the thiophenol at more elevated temperatures are particularly suitable for use as sulfide-cleavage catalysts at these lower temperatures. The use of solid phosphoric acid is also preferred for the sulfide cleavage because of its high degree of effectiveness in cleaving a t-alkyl group attached to the sulfur atom while at the same time causing no desulfurization of the compound. Other suitable acid catalysts that may be used include the natural and synthetic acid clays, aluminum phenoxide, aluminum o-cresoxide, 85 or 100 percent phosphoric acid, anhydrous zinc chloride, anhydrous sulfonic acids, and the like. It is observed that various of these catalysts are effective to different degrees; e.g., some of the aluminum phenoxide catalyst reacts with the olefin formed. With all the foregoing acid catalysts, where a t-butyl group is cleaved, isobutylene is formed and may be recovered from the reaction system. Specific sulfide-cleavage processes are disclosed and claimed in the following copending applications: M. D. Kulik and M. B. Neuworth, S.N. 94,164; R. J. Laufer, S.N. 94,163; and R. J. Laufer and M. B. Neuworth, S.N. 94,161; all filed March 8, 1961, and assigned to the assignee of the present application.

Sulfide cleavage may also be accomplished by using a reducing agent, e.g., an alkali metal dissolved in a nitrogenous solvent. Exemplary are sodium-liquid ammonia, sodium-pyridine, and lithium-alkylamines. The temperature at which these reducing agents are employed is generally determined by the boiling point of the solvent: e.g., sodium-liquid ammonia is generally used at −33° C., the atmospheric boiling point of ammonia; pyridine is used at 115° C., its reflux temperature; etc. These reducing agents are basic in nature and operate by a different mechanism from the acid catalysts in that the t-alkyl group is hydrogenated as well as cleaved. Thus when the t-butyl group is cleaved, isobutylene is not formed, but rather butanes and octanes primarily. These basic reducing agents are not ordinarily as desirable for use as the acid catalysts because isobutylene is not recoverable, and also the use of these alkali metal-solvent pairs is less convenient compared with use of the solid acid-type catalysts.

In the sulfide cleavage of the t-butyl group from either m-tolyl or p-tolyl t-butylated sulfides or from t-butyl 4-t-butyl-o-tolyl sulfide, solid phosphoric acid is preferred as catalyst, a temperature between 130 and 250° C. being suitable; a preferred temperature giving high yields and minimal degradation is between 160 and 170° C. at 20 mm. Hg pressure. Reduced pressure is employed to permit the products to distill from the system as formed; at the same time an adequate reaction temperature is maintained. A catalyst concentration between 2 and 20 percent by weight of the sulfide is suitable, with a concentration between 5 and 15 percent being preferred.

In a second aspect of this invention, a mixture of thiocresol isomers containing at least parathiocresol is reacted with a t-alkylating agent, preferably isobutylene, under alkylating conditions in the presence of a non-selective alkylating catalyst to provide a mixture consisting principally of the t-alkyl sulfides of all thiocresol isomers present. Where isobutylene is used, a partial separation of the butylated sulfides may be obtained by fine fractional distillation, with t-butyl o-tolyl sulfide and t-butyl m-tolyl sulfide boiling together as the lower boiling fraction and t-butyl p-tolyl sulfide constituting the higher boiling fraction. Parathiocresol may be recovered from the t-butyl p-tolyl sulfide by a sulfide-cleavage debutylation technique. Similarly, the mixture of o-tolyl and m-tolyl t-butylated sulfides may be debutylated by a sulfide-cleavage technique to yield a mxiture of o-thiocresol and m-thiocresol. For separation of these latter two thiocresol isomers, processing in accordance with selective ring-alkylating techniques would be required; i.e., the o-thiocresol would be converted to 4-t-butyl-o-thiocresol, and the m-thiocresol would be converted to t-butyl m-tolyl sulfide. The reaction products would then be separated by distillation and individually debutylated.

The second aspect of this invention is of principal utility where a mixture of butylated sulfides is already present or where the recovery of p-thiocresol per se is of primary interest. It will be readily apparent from the foregoing that many different initial mixtures with respect to mixed thiocresol and sulfide content may be treated within the framework of this invention.

The following examples are intended as illustrative and expository of the invention, and are not to be considered as limitations thereof.

*Example 1.—Selective Butylation of Mixed Thiocresols ($BF_3$—$H_3PO_4$ Catalyst)*

The catalyst was prepared by placing 85 percent $H_3PO_4$ (255 g.) into a reaction flask. Then $P_2O_5$ (99 g.) was added slowly to the vigorously stirred and cooled phosphoric acid at a rate so as to maintain the temperature below 85° C. Approximately 15 minutes was required for the $P_2O_5$ addition. The resultant 100% $H_3PO_4$ liquid was colorless and clear.

While vigorously stirring the 100% $H_3PO_4$, 246 g. of boron trifluoride ($H_3PO_4$ to $BF_3$ mole ratio of 1.0) was passed into the reaction flask at a rate of 2 grams per minute. At this boron trifluoride feed rate, the temperature leveled off at 55° C. No special cooling in the flask was therefore necessary to maintain the temperature below 120° C., at which temperature the $BF_3$—$H_3PO_4$ complex becomes unstable and begins to dissociate. The product $BF_3$—$H_3PO_4$ was a viscous light amber-colored liquid which fumed strongly when exposed to air. After cooling to room temperature, the complex was transferred to a glass-stoppered bottle and stored without any apparent gas pressure. This $BF_3$–100% phosphoric acid catalyst was used in all of the following examples where a $BF_3$—$H_3PO_4$ catalyst is specified unless otherwise shown.

Two thousand grams of mixed thiocresols (phenol free) was charged into a 5-liter flask followed by 200 g. of $H_3PO_4$—$BF_3$ catalyst. The temperature was raised to 60° C., and while maintaining vigorous stirring 720 grams of isobutylene (isobutylene/thiocresol mole ratio of 0.8) was charged at a rate of 9 g./min. The temperature was allowed to rise to 80° C. (exothermic reaction). After addition of the isobutylene was complete, the product was stirred for 3.5 hours at 80° C. Following this reaction period, the product was poured into a nitrogen-filled separatory funnel, and the catalyst, orange-red in color, was drawn off as a lower liquid phase, weighing 228 g. The supernatant liquid, protected by a nitrogen atmosphere, was neutralized with 5% $NaHCO_3$ (only 5–10 ml. required for neutralization), washed with 2000 ml. of water, decanted, and weighed (2680 g.). The crude reaction mixture was distilled through a ¾ in. x 4 ft. Cannon packed column.

The butylation of mixed thiocresols with isobutylene in the presence of $BF_3$—$H_3PO_4$ catalyst at 80° C. is a clean-cut reaction selectively ring butylating only the o-thiocresol. The formation of 4-t-butyl-o-thiocresol is favored, accompanied by about 18% of the sulfide of 4-t-butyl-o-thiocresol as t-butyl 4-t-butyl-o-tolyl sulfide. The t-butyl tolyl sulfides are derived almost entirely from the m-p-thiocresols, as shown in Table I. The unreacted thiocresols contain about 5% of the ortho isomer. However, this may be reduced by increasing the isobutylene to thiocresol ratio. The reaction products can be easily separated by fractional distillation since the boiling point difference of the various components varies from 18° to 35° C. Also, the alkylation catalyst may be recycled for several cycles. The foregoing results are summarized in Table I.

TABLE I.—BUTYLATION OF MIXED THIOCRESOLS

[Conditions: Isobutylene/thiocresol mole ratio: 0.8. Catalyst concentration: 10 wt. percent BF₃—H₃PO₄ (based on thiocresols charged), 80° C.; 3.5 hours]

| Feed Composition (percent by wt. thiocresols) | | Thiocresols Converted (percent by wt.) | Product Yield (mole percent based on corresponding thiocresol isomer converted) | | |
|---|---|---|---|---|---|
| | | | 4-t-Butyl-o-thiocresol | t-Butyl Tolyl Sulfide | t-Butyl 4-t-Butyl-o-tolyl Sulfide |
| Thiocresols | 100.0 | 70.0 | | 42.0 | |
| ortho- | 36.9 | 95.6 | 87.4 | 1.8 | 10.9 |
| meta- | 46.9 | 51.7 | | 82.0 | |
| para- | 16.2 | 64.8 | | 85.7 | |

Example 2.—Separation of Meta- and Parathiocresols From Their Mixtures

A 907-gram sample of t-butyl tolyl sulfides (3% ortho, 76% meta, 21% para by infrared), recovered from the t-butylation of mixed thiocresols, was subjected to fine fractionation on a 1 in. x 48 in. Cannon-packed column (estimated 20–25 theoretical plates) at a 15–20:1 reflux ratio under 50 mm. Hg pressure. Distillate was collected and analyzed (infrared) as follows:

| Fraction | Boiling Pt. (° C.) | Net Weight (grams) | Percent of Charge |
|---|---|---|---|
| Fore-run | 115–136.5 | 20 | 2.2 |
| t-Butyl m-Tolyl Sulfide (1.4% ortho, 94.5% meta, 4.1% para) | 136.5 | 274 | 30.2 |
| Intermediate | 136.5–139.5 | 478 | 52.7 |
| t-Butyl p-Tolyl Sulfide (0.6% meta, 99.4% para) | 139.5 | 127 | 14.0 |
| Residue and losses | | 8 | 0.9 |

A similar fractionation was carried out on a 2 in. x 7 ft. Cannon column (estimated 45 theoretical plates) to yield 34.3% of the lower-boiling distillate as 99+% t-butyl m-tolyl sulfide (vapor phase chromatography and infrared).

Example 3.—Sulfide Cleavage Debutylation of t-Butyl Tolyl Sulfides

Selected samples of t-butyl m-tolyl sulfide and t-butyl p-tolyl sulfide obtained from the run shown in Example 2 were separately debutylated over solid phosphoric acid catalyst (UOP #2) at 160–170° C. under 200 mm. Hg pressure. Distillate was redistilled prior to analysis. In each case, almost quantitative yields of the corresponding thiocresols were readily obtained. Isomeric purity was determined by infrared analysis to be 98+% in each case. Specific reaction conditions and results were as follows:

| | t-Butyl metatolyl sulfide | t-Butyl paratolyl sulfide |
|---|---|---|
| Initial, wt., g | 454 | 120 |
| Catalyst concn., wt. percent | 10 | 10 |
| Reaction temp. range, ° C | 164–167 | 167–184 |
| Pressure, mm. Hg | 200 | 200 |
| Time, hr | 1.5 | 1.5 |
| Conversion, mole percent | 86 | 83.4 |
| Thiocresol Yield, mole percent | 97.5 | 97.0 |
| Thiocresol Purity, percent | 99+ | 99.3 |

Example 4.—Sulfide Cleavage of t-Alkyl Aryl Sulfides

Various acid catalysts were found effective in the sulfide cleavage of the t-alkyl group from t-alkyl aryl sulfides. The reaction conditions and the results obtained are summarized in Table II.

TABLE II.—SULFIDE CLEAVAGE OF t-ALKYL ARYL SULFIDES

| Sulfide | Gram, moles | Catalyst, wt.(g.) | Atm. Reflux Temp., ° C. | Time,[b] Hours | Conversion of Sulfide, Percent | Products (mole percent of Converted Sulfide) | |
|---|---|---|---|---|---|---|---|
| | | | | | | Thiol | Olefin |
| t-Butyl phenyl | 1.5 | Aluminum thiophenoxide, 34 | 180–190 | 2 | 100 | 92 | 95 |
| Do | 1.0 | Aluminum o-cresoxide, 2/53 [a] | 195–197 | 7 | 91 | 94 | 65 |
| Do | 0.71 | 85% Orthophosphoric acid, 5 | 179–185 | 6 | 80 | 95 | 95 |
| Do | 0.71 | p-Toluenesulfonic acid, 10 | 178–187 | 3 | 99.6 | [c] 78 | 56 |
| t-Nonyl phenyl | 0.48 | Aluminum thiophenoxide, 15 | 158–180 | 2.5 | 100 | 88 | 92 |
| t-Nonyl 4-t-nonylphenyl | 1.4 | Aluminum thiophenoxide, 66 | 265–296 | 2.5 | ca. 100 | [d] 7 | 92 |
| Do | 1.0 | Aluminum o-cresoxide, 2.5/60 [a] | 326–338 | 0.75 | ca. 85 | [e] 49 | 25 |
| t-Butyl 4-chlorophenyl | 0.25 | Aluminum thiophenoxide, 7 | 156–204 | 4.5 | 68 | 98 | 88 |
| Do | 0.45 | 85% Orthophosphoric acid, 4 | 197–212 | 5.5 | 66 | 98 | 92 |

[a] Weight in grams aluminum/weight in grams o-cresol.
[b] Reaction time at the temperature indicated.
[c] Also obtained: 14.5 mole percent 4-t-butylthiophenol.
[d] The major products were thiophenol and materials boiling above nonylphenyl nonyl sulfide. The nonylthiophenol was 41% pure.
[e] The nonylthiophenol was 92% by titration (89% by infrared).

Many different combinations of thiocresols and their t-alkyl sulfides, particularly their t-butyl sulfides, may be separated in accordance with the process of this invention. Depending upon the specific proportions and components present in the mixture, it may be preferable to practice one or the other aspect of this invention or various combinations thereof. Thus in some instances the combination of both C-alkylation and S-alkylation in the presence of a selective ring-alkylating catalyst will be preferred; in other instances, total sulfide formation using a non-selective catalyst may be desired; in still other instances, a mixture of sulfides or a mixture of thiocresols and their sulfides may be first distilled. It is considered apparent that these are all variants of the process of this invention which is directed to separating hitherto unseparable mixtures of thiocresols and t-alkyl sulfides thereof. Thus the scope of this invention should be determined in accordance with the objects and claims thereof.

I claim:
1. In a process for refining a mixture containing at least one component selected from the group consisting of parathiocresol and its t-alkyl sulfide and at least one other component selected from the group consisting of ortho- and metathiocresols and their respective t-alkyl sulfides, the steps of reacting the mixture with a monoolefin containing from 4 to 12 carbon atoms, and in which the alkyl substituent formed is a tertiary alkyl group, in the presence of an alkylation catalyst under S-alkylating conditions to convert at least a portion of thiocresols present to t-alkyl sulfides thereof and fractionally distilling the mixture to separately recover at least the t-alkyl sulfide of parathiocresol.

2. The process according to claim 1 including the additional step of sulfide cleaving at least the t-alkyl sulfide of parathiocresol to form at least parathiocresol.

3. A process for refining mixed thiocresols containing parathiocresol and at least one thiocresol selected from the group consisting of ortho- and metathiocresols, which comprises t-alkylating said mixed thiocresols with a monoolefin having from 4 to 12 carbon atoms, and in which the alkyl substituent formed is a tertiary alkyl group, in the presence of a non-selective alkylation catalyst to convert thiocresols present to t-alkyl sulfides thereof, fractionally distilling the mixture to separately recover the t-alkyl sulfide of parathiocresol and at least one other sulfide selected from the group consisting of the t-alkyl sulfides of ortho- and metathiocresols, and separately sulfide cleaving the t-alkyl p-tolyl sulfide and at least a sulfide selected from the group consisting of the t-alkyl sulfides of ortho- and metathiocresols to form the respective thiocresol isomers.

4. The process according to claim 3 wherein said olefin is isobutylene.

5. The process according to claim 3 wherein said sulfide-cleaving step occurs in the presence of solid phosphoric acid as sulfide-cleavage catalyst.

6. A process for separately recovering t-alkyl p-tolyl sulfide from a mixture containing at least one other t-alkyl sulfide selected from the group consisting of t-alkyl sulfides of ortho- and metathiocresols, which comprises fractionally distilling the mixture using at least 20 theoretical plates to separately recover t-alkyl p-tolyl sulfide as higher boiling component and at least one other t-alkyl sulfide selected from the group consisting of t-alkyl sulfides of ortho- and metathiocresols as lower boiling component.

7. The process according to claim 6 wherein said t-alkyl group is t-butyl.

8. The process according to claim 6 including the subsequent steps of separately sulfide cleaving t-alkyl p-tolyl sulfide to form p-thiocresol and sulfide cleaving at least one sulfide selected from the group consisting of the t-alkyl sulfides of ortho- and metathiocresols to form the respective thiocresol isomer.

9. A process for recovering parathiocresol from a mixture consisting essentially of ortho-, meta-, and parathiocresols which comprises the steps in sequence of t-butylating said mixture with isobutylene in the presence of a non-selective alkylation catalyst to convert ortho-, meta-, and parathiocresol isomers to t-butyl sulfides thereof, fractionally distilling the butylated reaction mixture to separately recover a higher boiling fraction consisting of t-butyl p-tolyl sulfide and a lower boiling fraction consisting of a mixture of t-butyl m-tolyl sulfide and t-butyl o-tolyl sulfide, and separately sulfide cleaving the t-butyl p-tolyl sulfide to form p-thiocresol.

10. The process according to claim 9 wherein said sulfide-cleaving step occurs in the presence of solid phosphoric acid as sulfide-cleavage catalyst.

11. A process for separating individual meta- and parathiocresol isomers from a mixture consisting essentially of their t-alkyl sulfides which comprises the steps in sequence of fractionally distilling said reaction mixture to separately recover t-alkyl p-tolyl sulfide as higher boiling fraction and t-alkyl m-tolyl sulfide as lower boiling fraction, and separately sulfide cleaving at least one of said recovered sulfides to form the respective thiocresol isomer.

12. The process according to claim 1 wherein said t-alkyl group is t-butyl.

13. A process for recovering individual meta- and parathiocresol isomers from a mixture consisting essentially of meta- and parathiocresols which comprises the steps in sequence of alkylating said mixture with isobutylene in the presence of an alkylation catalyst to convert meta- and parathiocresols to t-butyl sulfides thereof, fractionally distilling the butylated reaction mixture to separately recover t-butyl p-tolyl sulfide as higher boiling fraction and t-butyl m-tolyl sulfide as lower boiling fraction, and separately sulfide cleaving the t-butyl m-tolyl sulfide and t-butyl p-tolyl sulfide to form m-thiocresol and p-thiocresol, respectively.

14. The process according to claim 13 wherein said sulfide cleaving step occurs in the presence of solid phosphoric acid as sulfide-cleavage catalyst.

15. A process for recovering individual thiocresol isomers from a mixture consisting essentially of the t-butyl sulfides of meta- and parathiocresols which comprises the steps in sequence of fractionally distilling said mixture to separately recover t-butyl p-tolyl sulfide as higher boiling fraction and t-butyl m-tolyl sulfide as lower boiling fraction, and separately sulfide cleaving the t-butyl m-tolyl sulfide and t-butyl p-tolyl sulfide in the presence of from 2 to 20 percent by weight solid phosphoric acid as sulfide-cleavage catalyst at a temperature between 130 and 250° C. to form m-thiocresol and p-thiocresol respectively and isobutylene.

References Cited in the file of this patent
UNITED STATES PATENTS
2,686,815    Nickels _____ Aug. 17, 1954

UNITED STATES PATENT OFFICE
CERTIFICATE OF CORRECTION

Patent No. 3,084,197　　　　　　　　　　　　　　　April 2, 1963

Robert J. Laufer

It is hereby certified that error appears in the above numbered patent requiring correction and that the said Letters Patent should read as corrected below.

Column 11, line 36, after "the" insert -- additional --; column 12, line 16, for the claim reference numeral "1" read -- 11 --.

Signed and sealed this 22nd day of October 1963.

(SEAL)
Attest:

ERNEST W. SWIDER
Attesting Officer

EDWIN L. REYNOLDS
Acting Commissioner of Patents